(12) United States Patent
Yanagihara

(10) Patent No.: US 8,868,566 B2
(45) Date of Patent: Oct. 21, 2014

(54) ELECTRONIC COMMUNICATION MESSAGING

(75) Inventor: Kazuhisa Yanagihara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 763 days.

(21) Appl. No.: 11/856,254

(22) Filed: Sep. 17, 2007

(65) Prior Publication Data

US 2009/0077026 A1    Mar. 19, 2009

(51) Int. Cl.
*G06F 17/30* (2006.01)
*G06Q 10/10* (2012.01)

(52) U.S. Cl.
CPC .................................. *G06Q 10/107* (2013.01)
USPC ......................................... 707/748; 709/206

(58) Field of Classification Search
CPC ................... G06F 17/30867; G06F 17/30761; G06F 17/243; G06F 3/048; G06F 17/30029; G06F 3/0237
USPC .................... 707/758, 748; 709/206
See application file for complete search history.

(56) References Cited

U.S. PATENT DOCUMENTS

| | | | |
|---|---|---|---|
| 5,379,057 A | 1/1995 | Clough et al. | |
| 5,675,362 A | 10/1997 | Clough et al. | |
| 7,277,901 B2 * | 10/2007 | Parker et al. | 707/707 |
| 8,468,168 B2 * | 6/2013 | Brezina et al. | 707/783 |
| 2001/0049745 A1 * | 12/2001 | Schoeffler | 709/238 |
| 2003/0115169 A1 * | 6/2003 | Ye | 707/707 |
| 2006/0004843 A1 * | 1/2006 | Tafoya et al. | 707/102 |
| 2006/0031359 A1 * | 2/2006 | Clegg et al. | 709/206 |
| 2006/0277195 A1 * | 12/2006 | Schulz et al. | 707/707 |
| 2007/0162587 A1 * | 7/2007 | Lund et al. | 709/223 |
| 2007/0288578 A1 * | 12/2007 | Pantalone | 709/206 |
| 2007/0294428 A1 * | 12/2007 | Guy et al. | 709/245 |
| 2008/0005108 A1 * | 1/2008 | Ozzie et al. | 707/707 |
| 2008/0010139 A1 * | 1/2008 | Elmer et al. | 705/14 |
| 2008/0071873 A1 * | 3/2008 | Gross | 709/206 |
| 2008/0147452 A1 * | 6/2008 | Renz et al. | 705/7 |
| 2008/0222170 A1 * | 9/2008 | Farnham et al. | 707/707 |
| 2009/0006285 A1 * | 1/2009 | Meek et al. | 706/12 |
| 2009/0011780 A1 * | 1/2009 | Salinas et al. | 455/466 |
| 2009/0030989 A1 * | 1/2009 | Maresh et al. | 709/206 |
| 2009/0089272 A1 * | 4/2009 | Oliver et al. | 707/705 |
| 2011/0225253 A1 * | 9/2011 | Brown et al. | 709/206 |
| 2011/0225254 A1 * | 9/2011 | Atkins et al. | 709/206 |
| 2012/0204095 A1 * | 8/2012 | Gao et al. | 715/234 |

* cited by examiner

*Primary Examiner* — Robert Beausoliel, Jr.
*Assistant Examiner* — Alexandria Bromell
(74) *Attorney, Agent, or Firm* — Wong, Cabello, Lutsch, Rutherford & Brucculeri, LLP

(57) ABSTRACT

Systems, methods, and apparatus related to suggesting components of an electronic communication. A component input associated with an electronic communication is received. Suggested recipient address sets of the electronic communication based on previous electronic communications associated with the component input are identified and presented to a user for selection.

21 Claims, 7 Drawing Sheets

| Component Set | To | cc | bcc | Freq. | Last Used | Attachment | Subject |
|---|---|---|---|---|---|---|---|
| 401 | A1, A2 | A3 | A4 | 1.00 | 0:32:57 | NULL | Status |
| 402 | A1, A2, A3 | A4 | NULL | 0.92 | 0:11:19 | D1 | Budget |
| 403 | A1, A2, A3 | A4 | A7 | 0.90 | 2:07:08 | D2 | Budget - Overruns |
| 404 | A8 | A9 | NULL | 0.83 | 1:59:08 | D1 | Budget |
| 405 | A1, A2 | A3, A8 | A4, A5 | 0.41 | 22:12:34 | D3 | Sales |
| 406 | A8 | A9 | NULL | 0.2 | 57:45:01 | NULL | Leads |
| 407 | A11 | A21 | NULL | MIN | 122:12:12 | NULL | Hello |
| 408 | A18 | NULL | A9 | MIN | 91:11:10 | NULL | Nothing Important |

ELECTRONIC COMMUNICATION MESSAGING

BACKGROUND

This document relates to electronic communication messaging.

Electronic communications, such as e-mail communications, have become prevalent in corporate, social, and other environments. Each electronic communication can include several components, such as addressing data, content data, and attachment data. The addressing data can specify one or more electronic addresses for one or more recipients. The content data can specify a subject of the electronic communication, and can include data related to the message, such as text data, image data, audio data, and video data. The attachment data can include files that are attached to the electronic communication, such as document files, video files, audio files, and executable files.

Often a sender of an electronic communication will address and send an electronic communication to the same group of recipients. Each recipient in the group must be entered for each of the multiple communications. For instance, in multiple e-mails sent to the same set of e-mail addresses, each recipient's address, e.g., e-mail address, and recipient type, e.g., a "To", "cc" or "bcc" recipient type, must be individually entered for each email. Additionally, other component data may also be frequently included in such electronic communications, such as the same subject data, text, and/or the same attachments.

When electronic communications are frequently sent to the same group of recipients, entering this data can be a tedious and repetitive task. Thus, many electronic communication programs allow a user to manually create "groups," e.g., a set of associated addresses identified as a user-defined group that a user may select when addressing an electronic communication. Creating and maintaining such groups, however, can be time consuming, as users must manually create the groups and specify the recipients, and the users must periodically update the groups to add and/or remove members. As a result, many users do not bother to create groups, and many of the groups that are created quickly become out of date. Additionally, creating such groups can be inefficient for such groups that are of temporal concern for the user, e.g., a group of recipients to which a user may send e-mails frequently for only several weeks or months.

SUMMARY

Disclosed herein are systems, methods, and apparatus related to suggesting components of an electronic communication. In one implementation, an address set in an electronic communication is identified. The address set is compared to historical address sets, and one or more historical address sets is suggested for the electronic communication based on the comparison.

In another implementation, a component input associated with an electronic communication is received. Recipient address sets of the electronic communication based on previous electronic communications associated with the component input are identified.

In another implementation, a system includes a data store and a component suggestion module. The data store stores historical communication data of electronic communications. The historical communication data includes associations of two or more electronic communication components. The electronic communication components can include electronic addresses, content, or attachments, and each association defines communication components identified in electronic communications. The component suggestion module is stored in a computer readable medium and includes computer executable instructions that upon such execution cause a computer device to identify electronic communication component input in an electronic communication, compare the electronic communication component input to the historical communication data, and suggest one or more associations of electronic communication components for use in the electronic communication based on the comparison.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
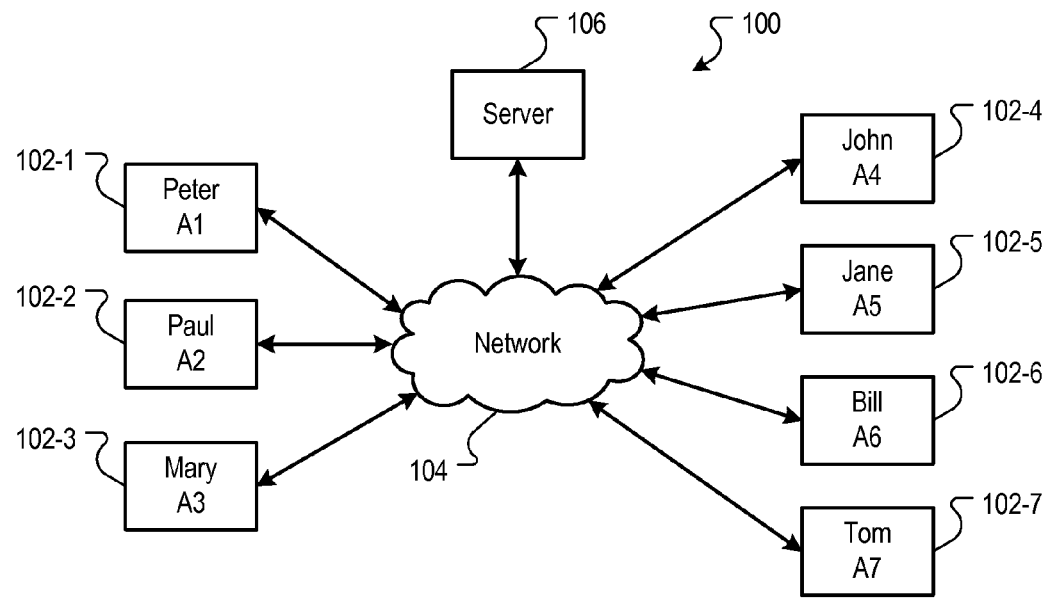
FIG. 1 is a block diagram of an example network environment in which an electronic communication messaging system can be implemented.

FIG. 1 is a block diagram of an example network environment 100 in which an electronic communication messaging system can be implemented. The network environment 100 includes user devices 102-1-102-7 that can communicate electronically with one another over the network 104. The network 104 can be a wide area network (WAN), such as the Internet, or can be a local area network (LAN). In some implementations, the network 104 can include a wireless network, such as a cellular network or an IEEE 802.11 compliant network, in combination with a wired network.

Each of the user devices 102-1-102-7 has a respective address A1-A7, e.g., an e-mail address, an internet protocol (IP) address, or some other electronic address that can be used for addressing electronic communications. Example user devices 102 include personal computers, laptop devices, wireless communication devices, or any other stationary or portable electronic device that can send and receive electronic communications over a wired and/or wireless network.

In some implementations, the communication devices 102 can, for example, communicate electronically according to a peer-to-peer communication protocol. In other implementations, the communication devices 102 can, for example, communicate electronically through a centrally located server 106 that acts as a central point for receiving and routing electronic communications between client user devices 102, such as an e-mail server. Other communication protocols and communication schemes that support multiple recipients according to a recipient address set for an electronic communication can also be used.

Figure 2:
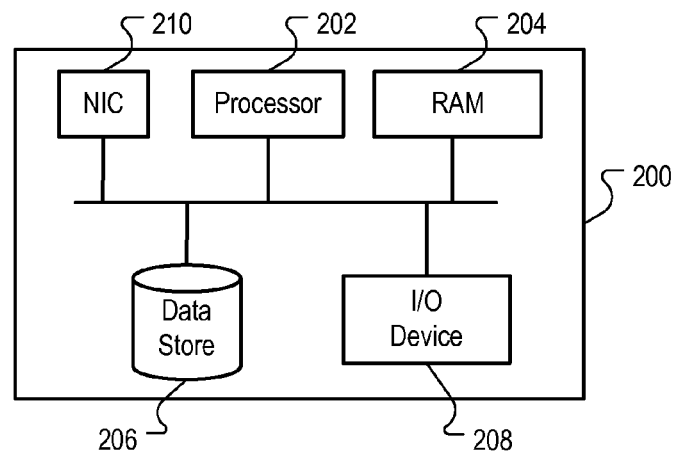
FIG. 2 is a block diagram of a computing device.

FIG. 2 is a block diagram of a computing device 200. The computing device 200 can, for example, be used to implement the user devices 102 and/or the server 106 of FIG. 1. Other computing devices, however, can also be used.

The computing device 200 includes a processor 202, random access memory (RAM) 204, a data store 206, input/output (I/O) devices 208, and a network interface card (NIC) 210. Example I/O devices 208 include a computer keyboard, mouse and monitor; a touch-sensitive display device; or other devices configured to facilitate the presentation of data to a user and to facilitate data input from the user. An example network interface card 210 can include a wired or wireless-enabled communication device configured to transmit and receive data over a network, such as the network 104. An example processor 202 can include a general purpose microprocessor capable of executing instructions stored in the data store 206. An example data store 206 can include a hard drive, a flash memory, or some other data storage device.

Figures 3, 4:
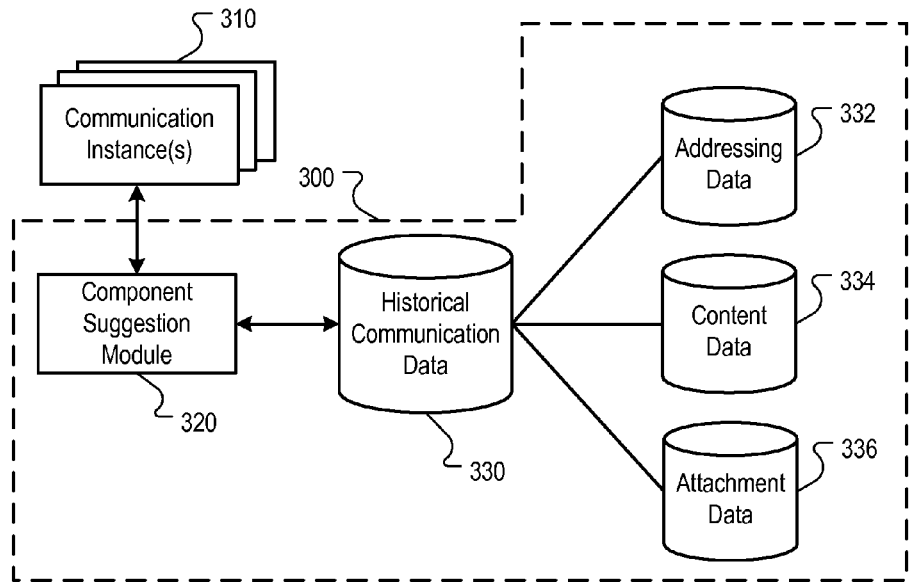
FIG. 3 is a block diagram of an example system for suggesting components of an electronic communication.
FIG. 4 is a table of an example association of electronic communication component inputs.

FIG. 3 is a block diagram of an example system 300 for suggesting components of an electronic communication. The system 300 can, for example, be implemented in a client device, such as a personal computer, or can be implemented in a server device, such as a mail server. Alternatively, the system 300 can be distributed across a client device and a server device. Other implementation architectures can also be used.

The system 300 communicates with the one or more communication instances 310, such as one or more e-mail programs, to identify and suggest one or more components for the electronic communication. For example, in a client-side implementation, the system 300 can communicate with a client e-mail application through a component suggestion module 320. Alternatively, in a server-side implementation, the system 300 can communication with multiple client e-mail applications through the component suggestion module 320.

The component suggestion module 320 can be embedded within a larger communication program, such as a client-side e-mail program, or a server-side e-mail management program, or may communicate with the communication instances 310 through an application programming interface (API). The component suggestion module 320 can receive component input related to an electronic communication from a communication instance 310 and can compare the components received from the communication instance 310 with historical communication data 330. Based on the comparison, the component suggestion module 320 can suggest address sets and/or other component input for the electronic communication.

Example historical communication data 330 can include associations of two or more electronic communication components. The electronic communication components include electronic address, content, or attachments, and each association can define communication components identified in previous electronic communications. For example, the historical communication data 330 can include addressing data 332, content data 334, and attachment data 336. The historical communication data 330 can define associations between the addressing data 332, content data 334, and attachment data 336, e.g., data associating the name of an attached file with the addresses to which the file was sent; or historical address sets, e.g., sets of addresses by recipient types; and other such associations.

In a client side implementation, the historical communication data 330 can include historical data for a particular user, e.g., addressing data 332 can include historical address sets of previous electronic communications addressed and/or sent by the user. Such historical address sets can be further associated with other historical data, such as content data 334, which can include subjects and body data; and attachment data 336, which can include attachment-related data.

In a server side implementation, the historical communication data 330 can include historical data for multiple users, e.g., addressing data 332 can include historical address sets of previous electronic communication addressed and/or sent by multiple users. Such historical address sets can be further associated with other historical data, such as content data 334, which can include subject and body data; and attachment data 336, which can include attachment-related data.

In some implementations, security protocols can be included to protect potentially sensitive information that may be stored or derived from the historical communication data store 330. For example, in some server side implementations, a separate historical communication data store 330 can be stored for each user, and each user may be authorized access to only the user's associated historical communication data store 330. In other server side implementations, a single historical communication data store 330 can be stored, and each client device may only be able to access the historical communication data store 330 by use of a password, a secured channel, or by some other protection scheme. When a user enters electronic communication component input, e.g., electronic addresses, attachments, or other component data, while editing an electronic communication in an editing environment, the component suggestion module 320 can compare the identified component input to historical component input stored in the historical communication data 330 and recommend one or more associations of electronic communication components to be used in the electronic communication. For example, when a user enters two or more recipient addresses in one or more of the To, cc, and/or bcc fields in an e-mail communication editing environment, the component suggestion module 320 can compare the identified address set to historical address sets stored in the historical communication data 330. Based on this comparison, the component suggestion module 320 can provide a drop down menu of possible To, cc and bcc addressing sets.

FIG. 4 is a table 400 of example associations of electronic communication component inputs. The data shown in the table 400 can, for example, be stored in the historical communication data 330. The associations illustrated in the table 400 can be realized in accordance with many data structure schemes, such as flat file implementation, an indexed record implementation, a relational database implementation, or some other data store implementation.

In the example table 400, the associations of component inputs 401-408 are ranked according to a usage parameter, such as a frequency measure, e.g., the parameter "Freq." An example frequency measure can be the number of times an e-mail with the corresponding association of component inputs is sent per average unit time, e.g., daily or weekly. Other frequency measures can also be used, e.g., the number of times an e-mail with the corresponding association of component inputs has been sent in total; the number of times an e-mail with the corresponding association of component inputs is sent per recent unit time, e.g., within the last day or within the last week, etc.

In some implementations, the frequency measure can be normalized, e.g., the association of component inputs 401 has the highest frequency value that is normalized to 1.00, the association of component inputs 402 has the next highest frequency valued normalized to 0.92, etc. Association of component inputs with a frequency measure of "MIN" can, for example, be associations that have only be identified a minimum number of times, e.g., once.

Other ranking schemes can also be used. For example, a predictive model, such as a Markov chain model, can be used to rank the address set according to one or more parameters, e.g., a time of day, or day of the week, etc.

In some implementations, a "Last Used" usage parameter can store the elapsed time from when a particular association of component inputs was last used to address an electronic communication. For example, the association of component inputs 401 was used 32 minutes and 57 seconds ago to address an electronic communication, while the association of component inputs 407 was used 122 hours, 12 minutes and 12 seconds ago to address an electronic communication. In some implementations elapsed time usage can be used, for example, to automatically delete an association if the corresponding elapsed time exceeds a predefined or user-selected value, e.g., 672 hours (four weeks).

In some implementations, the elapsed time usage can also be used to prioritize the list of suggested associations presented to the user. For example, if there are two associations that occurred substantially the same number of times and/or at substantially the same rate, the more recently used association can be presented at the top of an association list that is shown to the user.

The associations of component inputs 401-408 can include historical address data, e.g., the association 401 includes a historical address set A1, A2, A3 and A4, wherein the addresses A1 and A2 are designated a "To" type; the address A3 is designated a "cc" type; and the address A4 is designated a "bcc" type. The associations of component inputs 401-408 can also include attachment data, e.g., the association 402 includes an attachment document D1. Additionally, the associations of component inputs 401-408 can also include content data, e.g., the association 401 includes the subject text "Status." Other data can also be included.

In some implementations, each association 401-408 can be identified from previous electronic communications. For example, a user can install the component suggestion module 320 on computer device 102 or on a server 106, and the component suggestion module 320 can process stored electronic communication messages associated with the user's account to identify the associations. In some implementations, the associations 401-408 can be identified and/or updated with each instance of an electronic communication. For example, after the associations 401-408 are identified, the associations 401-408 can be updated each time an e-mail message is sent, e.g., sending several e-mails with the subject "Leads," and addressed to the address A8 and carbon copied to the address A9 would increase the frequency value of the component association 406.

More or less electronic communication component inputs can be stored in the table 400. For example, only addresses may be stored. Data in addition to the data shown in FIG. 4 can also be stored, such as a salutation line (e.g., the first line in the body of an e-mail message), a priority ranking (e.g., urgent, normal, low), etc.

FIGS. 5A-5E are screen shots of an example electronic communication editing environment 500 through which components for an electronic communication are suggested. Reference is made to the example associations 401-408 of FIG. 4 when describing the identification and suggestion of associated component data. The editing environment 500 can, for example, be an e-mail editing environment, which includes a "To" field 502, a "cc" field 504, a "bcc" field 506, an "Atch" (attachment) field 508, a "Subj" (subject) field 510, and a text field 512. Additional or fewer fields can be included.

In an implementation, the component suggestion module 320 can identify the communication component input in an electronic communication, e.g., addresses in one or more of the fields 502, 504 and 506; attachments in the field 508; subjects in the field 510; and/or text in the field 512. The component suggestion module 310 can compare the identified electronic communication component input to the historical communication data 330 and, based on the comparison, suggest one or more associations of electronic communication components, e.g., one or more of the associations 401-408, for use in the electronic communication.

Figure 5A:
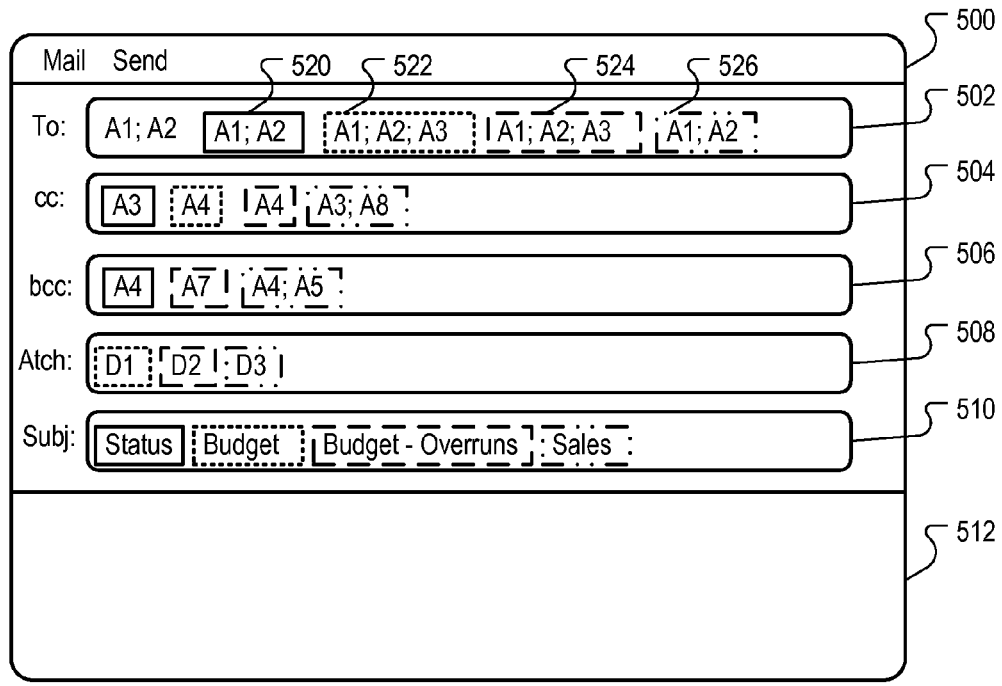
FIGS. 5A-5E are example electronic communication editing environments through which components for an electronic communication are suggested.

For example, FIG. 5A is an editing environment 500 in which a user has entered the electronic addresses A1 and A2 in the "To" field 502. The component suggestion module 320 can compare the address set A1 and A2 to the associations of component inputs 401-408 to identify matching historical address sets in the associations of component inputs 401-408. Based on this identification of matching address sets, the component suggestion module 320 can suggest one or more associations of component inputs 401-408 as candidates for use in the preparation of the electronic communication. As shown in FIG. 4, the associations of component inputs 401, 402, 403 and 405 each include a historical address set that includes A1 and A2 in the "To" field 502. Accordingly, each of these associations of component inputs 401, 402, 403 and 405 can be suggested for use in preparing the electronic communication.

In some implementations, the identified associations can each be presented in the editing environment and offset by a visual indicator. For example, in FIG. 5A, each association 401, 402, 403 and 405 is offset by a colored background, as indicated by the respective line patterns 520, 522, 524 and 526. For example, the association 401, which is an address set having address A1 and A2 associated with a "To" recipient type, address A3 associated with a cc recipient type, and address A4 associated with a "bcc" recipient type, can be highlighted in the fields 502, 504, and 506. Similarly, the associations of component inputs 402, 403 and 405 can be similarly highlighted as appropriate.

In the implementation of FIG. 5A, selection of any one of the suggested associations 401, 402, 403 or 405, such as selection by a mouse click, can result in the selected association being used to address the electronic communication, and possibly to include additional data in the electronic communication, if such additional data is included in the selected association. For example, selection of the association 401 would result in the electronic communication having the addresses A1 and A2 in the To field 502, the address A3 in the cc field 504, the address A4 in the bcc field 506, and the subject "Status" being included in the subject field 510.

In some implementations, only a subset of an association may be displayed. For example, only the candidate addresses may be displayed in the "To" field 502.

In some implementations, the suggested associations are displayed according to a rank. The rank can, for example, be based on the frequency at which the suggested associations have been used over a period of time, e.g., within the last week, last month, etc. For example, the component associations 401, 402, 403 and 405 are presented according to the frequency measure stored in the table 400. Upon the selection of a suggested association, the corresponding frequency measures are updated.

Instead of selecting a suggested association, a user may continue to manually input addresses or other component data. The component suggestion module 320 can also refine suggestions based on identified user inputs. For example, if the user inputs A3 into the "To" field 502, the candidate associations of component inputs can be narrowed to associations 402 and 403.

Figure 5B:
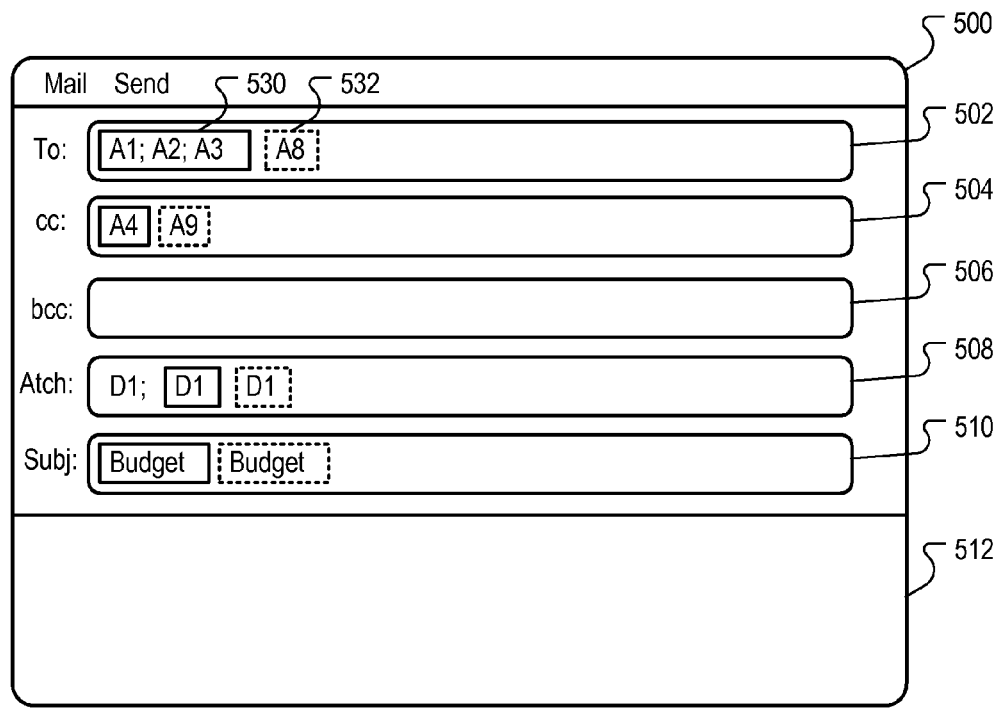

Component data other than addresses can be used to identify candidate associations of component inputs. For example, FIG. 5B is the editing environment 500 in which a user has attached a document D1 in the attachment field 508 The component suggestion module 320 can compare the attachment D1 to the associations of component inputs 401-408 to identify candidate associations of component inputs that include the document D1, e.g., associations 402 and 404. The identified candidate associations 402 and 404 are displayed as suggested component inputs, as indicated by the respective line patterns 530 and 532.

Figure 5C:
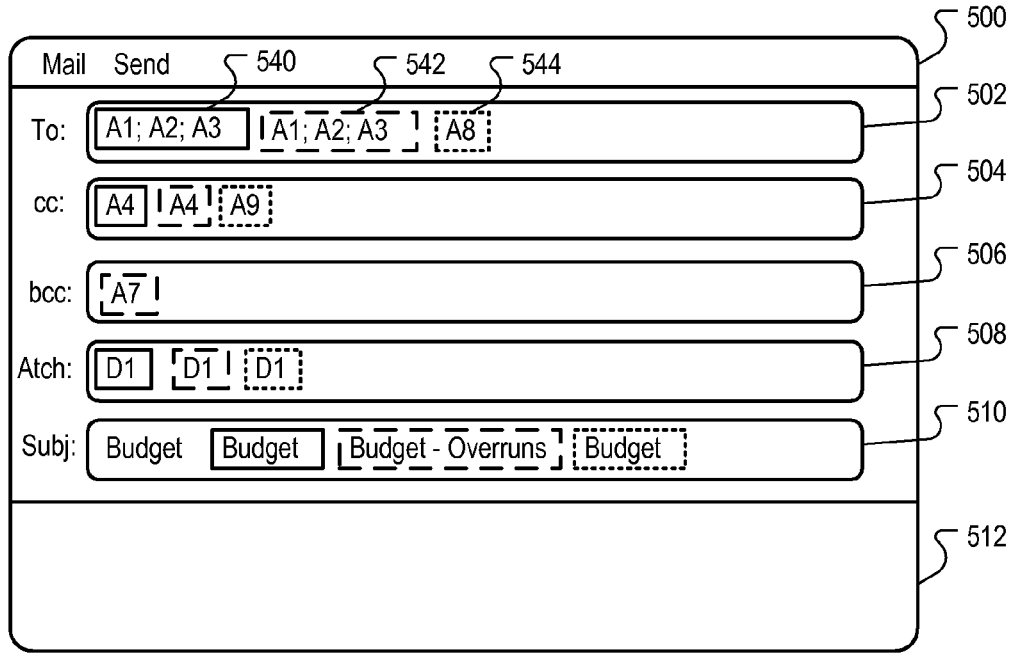

By way of another example, FIG. 5C is the editing environment 500 in which a user has entered the subject "Budget" in the subject field 510. The component suggestion module 320 can compare the text from the subject field 510 to the associations of component inputs 401-408 to identify candidate associations of component inputs that include the text "Budget" in the subject field 510, e.g., associations 402, 403 and 404. The identified candidate associations 402, 403 404 are displayed as displayed as suggested component inputs, as indicated by the respective line patterns 540, 542 and 544.

Figure 5D:
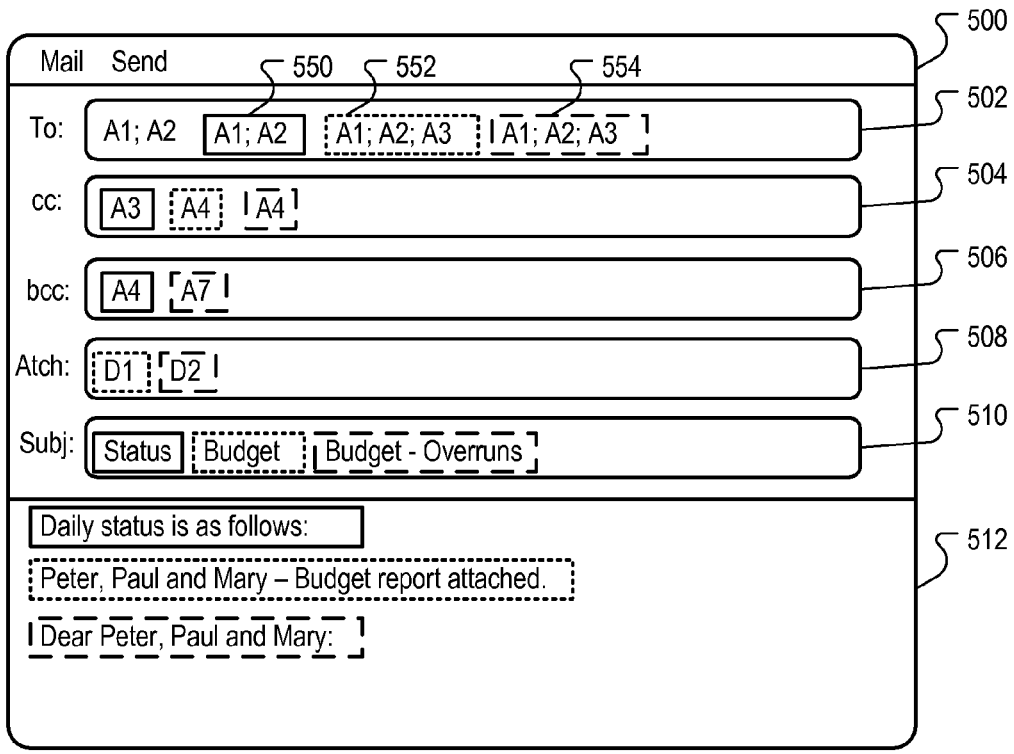

The number of suggested component inputs can be limited based on a usage parameter. For example, FIG. 5D is the editing environment 500 in which a user has entered the electronic addresses A1 and A2 in the "To:" field. The candidate associations that are suggested, as indicated by the line patterns 550, 552 and 554, include only the associations of component inputs 401, 402 and 403. Unlike FIG. 5A, which included all possible associations of component inputs, e.g., associations 401, 402, 403 and 405, only the associations of component inputs having a frequency measure that exceeds a threshold value, e.g., 0.50, are suggested. The threshold value can, for example, correspond to a user defined value, e.g., messages that are addressed to particular address sets more than 10 times per week.

Additional data can also be stored as component inputs and suggested. For example, content data associated with text input can also be suggested. As shown in FIG. 5D, the first line of an e-mail communication, such as a salutation, can be suggested.

Figure 5E:
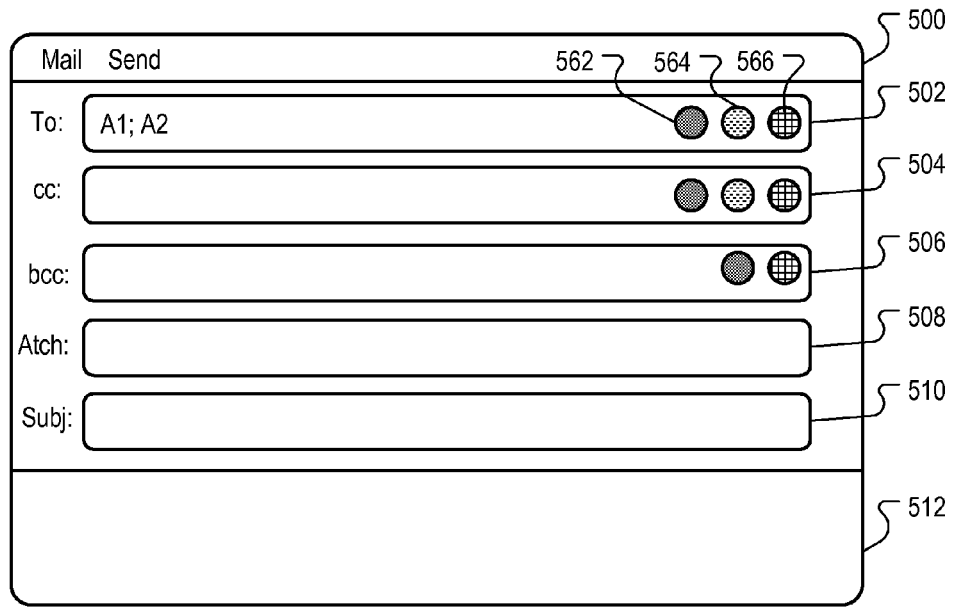

Other selection user interface schemes can also be used to suggest candidate associations or candidate historical address sets. For example, FIG. 5E is the editing environment 500 in which a user has entered the electronic addresses A1 and A2 in the "To:" field. In this implementation, selectable divots 562, 564 and 566 can be displayed in the address fields 502, 504 and 506. The divots 562, 564 and 566 can correspond to the associations 401, 402 and 403. The divots 562, 564 and 566 can be present in address fields that are populated by one or more addresses for the association corresponding to the divot. Thus, divots 562, which correspond to the address set stored in the association 401, are present in fields 502, 504, and 506; divots 564, which correspond to the address set stored in the association 402, are present in fields 502 and 504; and divots 566, which correspond to the address set stored in the association 403, are present in fields 502, 504, and 506.

Selection of a divot can, for example, provide a contextual drop down list of associated addresses for viewing by the user. Other user interface elements can also be used, e.g., drop down menus, etc.

In another implementation, and address set in an electronic communication need not exclusively match a historical address set for the historical address set to be suggested. Instead, an inclusive match, e.g., a match between any two or more addresses in the electronic communication and a historical address set, can result in a suggestion of the historical address set. If selected, the suggested historical address set can be substituted for the matching addresses in the electronic communication.

For example, a user may often send an e-mail to addresses A1, A2 and A3, resulting in the storage of a historical address set TO: A1, A2 and A3. However, a user may decide to later include the address A4 in the e-mail message that is normally addressed to A1, A2 and A3. Thus, upon entering the addresses A4, A1, and A2 (or A4 and any two addresses of A1, A2 and A3), the historical address set A1, A2, and A3 can be suggested.

In some implementations, the selection of an inclusively matched historical address set can result in a substitution of the matching addresses in the address set of the electronic communication by the selected historical address set. For example, for the address set A4, A1 and A2 in the e-mail described above, selecting the suggested historical address set A1, A2 and A3 will, in turn, substitute the addresses A1 and A2 by the addresses A1, A2 and A3, resulting in an address set of A4, A1, A2 and A3.

In some implementations, a user can select whether inclusive or exclusive matching and substitution can be used. For example, a user can select a check box in a preferences environment that determines whether inclusive or exclusive matching is used.

Figure 6:
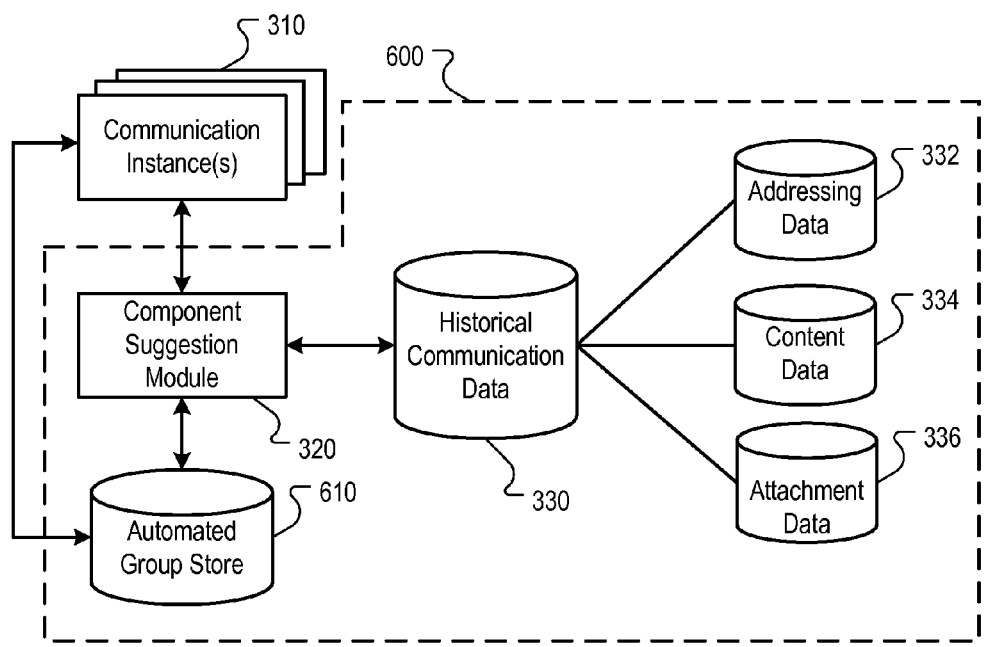
FIG. 6 is a block diagram of another example system for suggesting components of an electronic communication.

FIG. 6 is a block diagram of another example system 600 for suggesting components of an electronic communication. The system 600 operates in a similar manner to the system 300 of FIG. 3. The component suggestion module 320, however, is further configured to determine if a usage parameter of a component input association exceeds an automated group storage threshold. If the component suggestion module 320 determines that the usage parameter of a component input association exceeds an automated group storage threshold, then the address sets of the association can be stored as an automated group in an automated group store 610. Similarly, the component suggestion module 320 can delete or disable an automated group from the automated group store 610 if the component suggestion module 320 determines that the usage parameter of the corresponding component input association is less than the automated group storage threshold.

The system 600 can, for example, be implemented in a client device, such as a personal computer, or can be implemented in a server device, such as a mail server. Alternatively, the system 600 can be distributed across a client device and a server device. Other implementation architectures can also be used. In some implementations, the component suggestion module 320 can provide the automated group to computer devices associated with the recipient addresses stored in the automated group.

The system 600 thus facilitates the automatic creation and automatic removal of automated groups. For example, a group of seven employees, such as the users of the computers devices 120-1-120-7 of FIG. 1, may be assigned to a temporary task that may span several weeks or months. As may often occur, multiple e-mail messages with particular addressing schemes may be generated among the users in the group. For example, the employee Peter may send daily e-mails according to the address scheme To: A2, A3, A4, A5 and cc: A6 and A7. Accordingly, the system 600 may identify an automated group defining the address scheme of From: A1, To: A2, A3, A4, A5 and cc: A6 and A7, and thus the group can be selected by the employee Peter when addressing e-mail communications to the group.

In some implementations, the system 600 can provide the automated group to all computer devices associated with addresses in the automated group. Furthermore, the automated group can be modified for each computer device, depending on the computer device address. For example, the computer device 120-4 may locally store an automated group defining the address scheme of From: A4, To: A1, A2, A3, A5 and cc: A6 and A7, and the computer device 120-7 may locally store an automated group defining the address scheme of From: A7, To: A1, A2, A3, A4, A5 and cc: A6.

After the temporary task is completed, e-mail communications that are sent to the automated group will likely decrease or cease altogether. Accordingly, once the usage parameter falls below the automated group storage threshold, the automated group can be removed from the automated group store 610.

Figure 7:
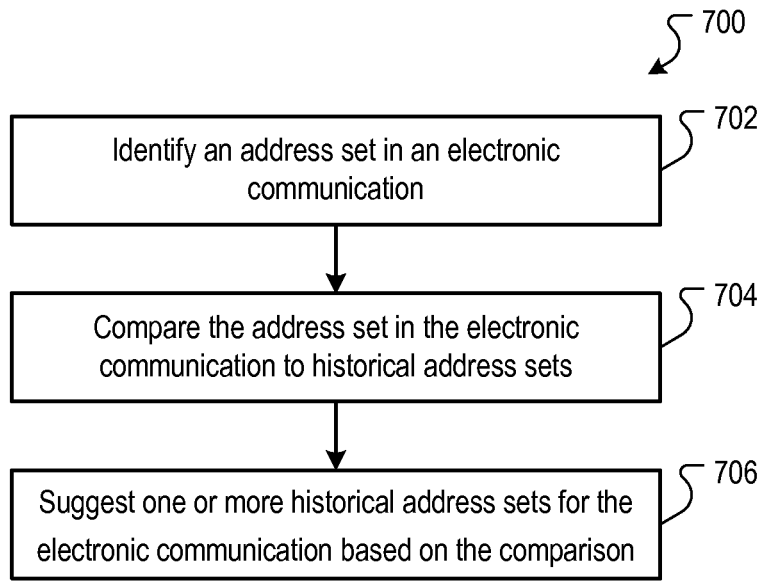
FIG. 7 is a flow diagram of an example process for suggesting address sets for an electronic communication.

FIG. 7 is a flow diagram of an example process 700 for suggesting address sets for an electronic communication. The example process 700 can be implemented in the system 300 of FIG. 3 or the system 600 of FIG. 6.

Stage 702 identifies an address set in an electronic communication. For example, the component suggestion module 320 can identify addresses input into one or more of the fields 502, 504 and 506 of the editing environment 500.

Stage 704 compares the address set in the electronic communication to historical address sets. For example, the component suggestion module 320 can compare the addresses input into one or more of the fields 502, 504 and 506 of the editing environment 500 to the addresses stored in the historical communication data 330.

Stage 706 suggests one or more historical address sets for the electronic communication based on the comparison. For example, the component suggestion module 320 can suggest one or more of the address sets stored in the historical communication data 330 based on the comparison, such as the address sets described in FIG. 5A.

Figure 8:
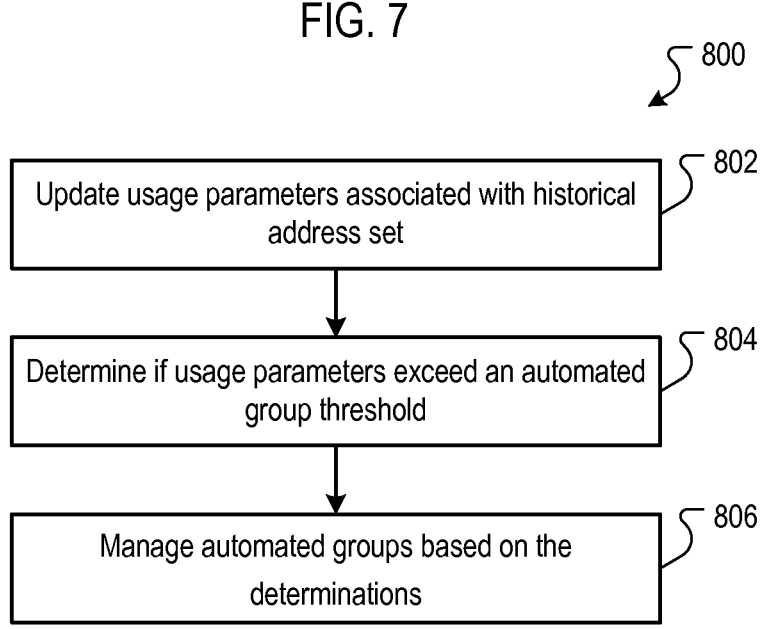
FIG. 8 is a flow diagram of an example process for managing automated groups.

FIG. 8 is a flow diagram of an example process 800 for managing automated groups. The example process 800 can be implemented in the system 600 of FIG. 6.

Stage 802 updates usage parameters associated with historical address set. For example, the component suggestion module 320 can update the frequency measure "Freq." of the table 400 each time an electronic communication is transmitted.

Stage 804 determines if usage parameters exceed an automated group threshold. For example, the component suggestion module 320 can determine if frequency measures exceed an automated group storage threshold.

Stage 806 manages automated groups based on the determinations. For example, the component suggestion module 320 can add or delete automated groups stored in the automated group store 610 based on the determinations of stage 804.

Figure 9:
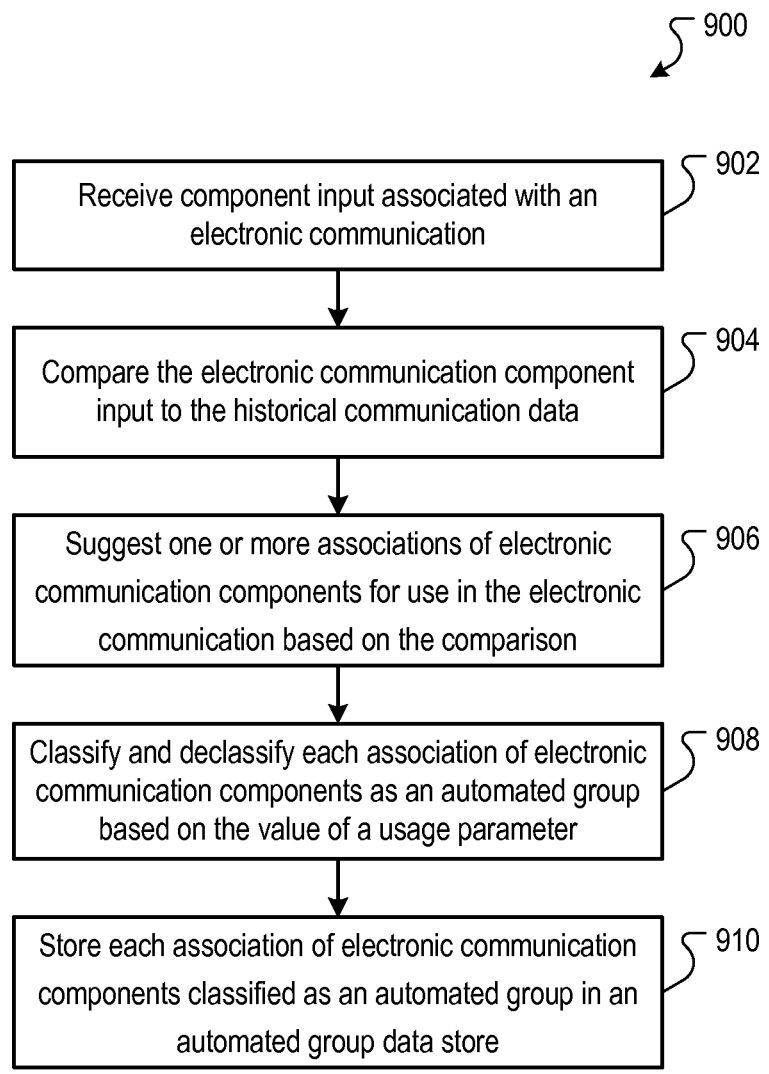
FIG. 9 is a flow diagram of an example process for suggesting components of an electronic communication.

FIG. 9 is a flow diagram of an example process 900 for suggesting components of an electronic communication. The example process 900 can be implemented in the system 600 of FIG. 6.

Stage 902 receives component input associated within an electronic communication. For example, the component suggestion module 320 can identify addresses input into one or more of the fields 502, 504 and 506 of the editing environment 500; or can identify attachments input into the field 508; or can identify a subject input into the field 510.

Stage 904 compares the electronic communication component input to the historical communication data. For example, the component suggestion module 320 can compare the electronic communication component input to the historical communication data 330, as described with reference to FIGS. 5A-5E.

Stage 906 suggests one or more associations of electronic communication components for use in the electronic communication based on the comparison. For example, the component suggestion module 320 can suggest one or more associations of candidate electronic communication components, as described with reference to FIGS. 5A-5E.

Stage 908 classifies and declassifies each association of electronic communication components as an automated group based on the value of a usage parameter. For example, the component suggestion module 320 can update the frequency measure of each suggested association based on user selections and compare the frequency measures to an automated group threshold. If the frequency measure exceeds the automated group threshold, the component suggestion module 320 can classify the association of electronic communication components as an automated group. Conversely, if the frequency measure does not exceed the automated group threshold, the component suggestion module 320 can declassify any associations that are classified as an automated group.

Stage 910 stores each association of electronic communication components classified as an automated group in an automated group data store. For example, the component suggestion module 320 can store associations classified as automated groups in the automated group data store 610.

Although the examples herein have been directed primarily to e-mail applications, other forms of electronic communication can benefit from the systems and methods disclosed herein. For example, suggestions of historical address sets can also be made in chat room applications, voice over IP (VoIP) communications, and other forms of electronic communication. In a chat room environment, for example, several users may often create a chat room to discuss work-related or personal topics. Accordingly, an automated chat room can be automatically created and managed for the chat room participants, e.g., one or more automated chat room elements may be made available to a user from a chat program environment, and the selection of one of the automated chat room elements can instantiate a chat room and invite the other participants. Likewise, regularly scheduled conference calls over a VoIP resource, e.g., a weekly conference call to discuss a team status, can be automatically created and managed as an automated conference call element, the selection of which can instantiate a conference call and place calls to the other participants.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method executed by one or more computers, comprising:
   receiving, from a first address input field of an editing environment having a plurality of address input fields, a recipient address of an electronic communication, each of the address input fields being associated with a distinct recipient type that is one of a "to" type, a "cc" type, or a "bcc" type, wherein the first address input field is associated with a first recipient type;
   identifying, from one or more historical address groups stored on a non-transitory storage device, a historical address group based on the received recipient address, the historical address group comprising a first historical address having the first recipient type and one or more second historical addresses having a second recipient type that is different from the first recipient type, the first historical addresss and the one or more second historical addresses being associated in the historical address group by being addresses of the respective recipient types in a previous electronic communication, wherein identifying the historical address group comprises determining a match between the first historical address and the received recipient address; and
   providing the one or more second historical addresses in the identified historical address group for display in a second address input field of the editing environment as a recipient suggestion, the second address input field being associated with the second recipient type.

2. The method of claim 1, wherein providing the one or more second historical addresses in the identified historical address group for display comprises offsetting each of the one or more second historical addresses by a different colored background, and wherein the different colored background indicates the association of a particular second historical address with a particular historical address group.

3. The method of claim 1, wherein providing the one or more second historical addresses in the identified historical address group for display comprises suggesting one or more historical address groups based on a frequency of use of each historical address group.

4. The method of claim 1, further comprising:
   receiving a selection of a suggested historical address; and
   updating a usage parameter associated with the selected historical address.

5. The method of claim 4, further comprising:
   determining if the usage parameter exceeds an automated group storage threshold; and
   storing the identified historical address group as an automated group if the usage parameter exceeds the automated group storage threshold.

6. The method of claim 5, further comprising:
   updating usage parameters associated with historical address groups that are not selected; and
   for each historical address group that is not selected:
      determining if the historical address group is stored as an automated group; and
      upon determining that the historical address group is stored as the automated group, deleting the automated group if the corresponding usage parameter associated with the historical address group is less than an automated group threshold.

7. The method of claim 6, further comprising, for each automated group:
   determining recipient addresses defined in the automated group; and
   providing the automated group to a computer device associated with the recipient addresses.

8. The method of claim 1, wherein determining a match between the first historical address and the received recipient address comprises exclusively matching the received recipient address to the first historical address.

9. The method of claim 1, wherein the identified historical address group is associated with a set of one or more attachments based on prior association of the set of one or more attachments with the identified historical address group.

10. The method of claim 9, further comprising: providing the set of one or more attachments as an attachment suggestion for display in an attachment display field of the editing environment.

11. The method of claim 1, wherein the identified historical address group is associated with an e-mail subject based on prior association of the e-mail subject with the identified historical address group.

12. The method of claim 11, further comprising: providing the e-mail subject as a subject suggestion for display in a subject display field of the editing environment.

13. A system, comprising:
   one or more computers configured to perform operations comprising:
   receiving, from a first address input field of an editing environment having a plurality of address input fields, a recipient address of an electronic communication, each of the address input fields being associated with a distinct recipient type that is one of a "to" type, a "cc" type, or a "bcc" type, wherein the first address input field is associated with a first recipient type;
   identifying, from one or more historical address groups stored on a non-transitory storage device, a historical address group based on the received recipient address, the historical address group comprising a first historical address having the first recipient type and one or more second historical addresses having a second recipient type that is different from the first recipient type, the first historical address and the one or more second historical addresses being associated in the historical address group by being addresses of the respective recipient types in a previous electronic communication, wherein identifying the historical address group comprises determining a match between the first historical address and the received recipient address; and
   providing the one or more second historical addresses in the identified historical address group for display in a second address input field of the editing environment as a recipient suggestion, the second address input field being associated with the second recipient type.

14. The system of claim 13, wherein providing the one or more second historical addresses in the identified historical address group for display comprises suggesting one or more historical address groups based on a frequency of prior association.

15. The system of claim 13, wherein the identified historical address group is associated with a set of one or more attachments based on prior association of the set of one or more attachments with the identified historical address group.

16. A non-transitory storage medium storing computer instructions, the computer instructions operable to cause one or more processors to perform operations comprising:

receiving, from a first address input field of an editing environment having a plurality of address input fields, a recipient address of an electronic communication, each of the address input fields being associated with a distinct recipient type that is one of a "to" type, a "cc" type, or a "bcc" type, wherein the first address input field is associated with a first recipient type;

identifying, from one or more historical address groups stored on a non-transitory storage device, a historical address group based on the received recipient address, the historical address group comprising a first historical address having the first recipient type and one or more second historical addresses having a second recipient type that is different from the first recipient type, the first historical address and the one or more second historical addresses being associated in the historical address group by being addresses of the respective recipient types in a previous electronic communication, wherein identifying the historical address group comprises determining a match between the first historical address and the received recipient address; and providing the one or more second historical addresses in the identified historical address group for display in a second address input field of the editing environment as a recipient suggestion, the second address input field being associated with the second recipient type.

17. The non-transitory storage medium of claim 16, the operations further comprising:

receiving a selection of a suggested historical address; and
updating a usage parameter associated with the selected historical address.

18. The non-transitory storage medium of claim 16, wherein the identified historical address group is associated with a set of one or more attachments based on prior association of the set of one or more attachments with the identified historical address group.

19. The non-transitory storage medium of claim 18, the operations further comprising:

providing the set of one or more attachments as an attachment suggestion for display in an attachment display field of the editing environment.

20. The non-transitory storage medium of claim 16, wherein the identified historical address group is associated with an e-mail subject based on prior association of the e-mail subject with the identified historical address group.

21. The non-transitory storage medium of claim 20, the operations further comprising: providing the e-mail subject as a subject suggestion for display in a subject display field of the editing environment.

* * * * *

UNITED STATES PATENT AND TRADEMARK OFFICE
CERTIFICATE OF CORRECTION

| | | |
|---|---|---|
| PATENT NO. | : 8,868,566 B2 | Page 1 of 1 |
| APPLICATION NO. | : 11/856254 | |
| DATED | : October 21, 2014 | |
| INVENTOR(S) | : Kazuhisa Yanagihara | |

It is certified that error appears in the above-identified patent and that said Letters Patent is hereby corrected as shown below:

In the Claims,

Column 11, Line 28, "addresss" should be replaced with --address--;

Signed and Sealed this
Seventeenth Day of February, 2015

Michelle K. Lee
*Deputy Director of the United States Patent and Trademark Office*